United States Patent
Akyol (10) Patent No.: US 7,729,276 B2
(45) Date of Patent: Jun. 1, 2010

(54) METHOD AND SYSTEM FOR TUNNELING MACSEC PACKETS THROUGH NON-MACSEC NODES

(75) Inventor: Bora Akyol, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 335 days.

(21) Appl. No.: 11/685,554

(22) Filed: Mar. 13, 2007

(65) Prior Publication Data

US 2008/0123652 A1 May 29, 2008

Related U.S. Application Data

(60) Provisional application No. 60/867,765, filed on Nov. 29, 2006.

(51) Int. Cl.
*H04L 12/26* (2006.01)
*H04L 12/56* (2006.01)
*G06F 15/173* (2006.01)

(52) U.S. Cl. .................. 370/252; 370/392; 709/242

(58) Field of Classification Search ............ None
See application file for complete search history.

(56) References Cited

U.S. PATENT DOCUMENTS

| | | | |
|---|---|---|---|
| 6,708,218 B1 * | 3/2004 | Ellington et al. | 709/236 |
| 7,215,667 B1 * | 5/2007 | Davis | 370/389 |
| 2006/0112431 A1 * | 5/2006 | Finn et al. | 726/22 |
| 2006/0136715 A1 * | 6/2006 | Han et al. | 713/151 |
| 2006/0248599 A1 | 11/2006 | Sack et al. | |
| 2006/0259759 A1 * | 11/2006 | Maino et al. | 713/151 |
| 2008/0075073 A1 * | 3/2008 | Swartz | 370/389 |
| 2008/0123652 A1 * | 5/2008 | Akyol | 370/392 |
| 2008/0126559 A1 * | 5/2008 | Elzur et al. | 709/232 |
| 2008/0130889 A1 * | 6/2008 | Qi et al. | 380/257 |
| 2008/0141023 A1 * | 6/2008 | Qi | 713/155 |
| 2009/0217032 A1 * | 8/2009 | Guan | 713/154 |
| 2009/0307751 A1 * | 12/2009 | Lin et al. | 726/3 |

* cited by examiner

*Primary Examiner*—Gregory B Sefcheck
(74) *Attorney, Agent, or Firm*—McAndrews, Held & Malloy, Ltd.

(57) ABSTRACT

Aspects of a method and system for tunneling MACSec packets through non-MACSec-enabled nodes are provided. In this regard, aspects of the invention may be utilized for transmitting MACSec Ethernet packets over MACSec and/or non-MACSec-enabled network nodes. In one embodiment of the invention, additional header information may be inserted into a MACSec packet before transmitting the MACSec packet to a non-MACSec-enabled node. Accordingly, aspects of the invention may remove the additional header information from a packet received from a non-MACSec-enabled node to distinguish the packets comprising inserted additional header information, which may comprise a distinguishing Ethertype.

33 Claims, 6 Drawing Sheets

METHOD AND SYSTEM FOR TUNNELING MACSEC PACKETS THROUGH NON-MACSEC NODES

CROSS-REFERENCE TO RELATED APPLICATIONS/INCORPORATION BY REFERENCE

This patent application makes reference to, claims priority to and claims benefit from U.S. Provisional Patent Application Ser. No. 60/867,765 filed on Nov. 29, 2006.

The above stated application is hereby incorporated by reference in its entirety.

FIELD OF THE INVENTION

Certain embodiments of the invention relate to computer networking. More specifically, certain embodiments of the invention relate to a method and system for tunneling MACsec packets through non-MACsec nodes.

BACKGROUND OF THE INVENTION

A computer network is a collection of two or more computing nodes, which are communicatively coupled via a transmission medium and utilized for transmitting information. Most networks adhere to the layered approach provided by the open systems interconnect (OSI) reference model. The OSI reference provides a seven (7) layer approach, which includes an application layer, (Layer 7), a presentation layer (layer 6), a session layer (Layer 5), a transport layer (Layer 4), a network layer (Layer 3), a data link layer (Layer 2) and a physical layer (Layer 1). Layer 7 through layer 5 inclusive may comprise upper layer protocols, while layer 4 through layer 1 may comprise lower layer protocols. Some networks may utilize only a subset of 7 layers. For example, the TCP/IP model, or Internet Reference model generally utilizes a fiver layer model, which comprises an application layer, (Layer 7), a transport layer (Layer 4), a network layer (Layer 3), a data link layer (Layer 2) and a physical layer (Layer 1). These five layers can be broken down into a fairly specific set of responsibilities or services, which they provide.

Layer 7, the application layer, is typically responsible for supporting network applications such as web browsers and email clients, and is typically implemented in software in end systems such as personal computers and servers. Typical layer 5 protocols comprise HTTP to support the World Wide Web, and SMTP to support electronic mail.

Layer 6, the presentation layer, is typically responsible for masking any differences in data formats that may occur between dissimilar or disparate systems. The presentation layer specifies architecture independent data transfer formats and may enable encoding, decoding, encryption, decryption, compression and/or decompression of data.

Layer 5, the session layer, is typically responsible for managing user session dialogues. In this regard, the session layer may be enabled to control establishment and/or termination of logical links between users. The session layer may also be enabled to provide handling and reporting of upper layer errors.

Layer 4, the transport layer, is typically responsible for passing application layer messages between the client and server sides of an application. In this regard, the transport layer may be enabled to manage end-to-end delivery of messages in the network. The transport layer may comprise various error recovery and/or flow control mechanisms, which may provide reliable delivery of messages. By far the two most common Layer 4 protocols are transmission control protocol (TCP) and user datagram protocol (UDP), which are used in the Internet.

Layer 3, the network layer, is typically responsible for determining how data may be transferred between network devices. Data may be routed according to unique network addresses. In this regard, the network layer may route, for example, datagrams between end systems. Internet Protocol (IP), for example, defines the form and content of the datagrams and is implemented in Layer 3 in combination with any number of routing protocols which may be implemented in the various nodes (devices such as bridges and routers) along a datagram's path from one end system to another.

Layer 2, the data link layer, is typically responsible for moving a packet of data from one node to another. The data link layer defines various procedures and mechanisms for operating communication links and may enable, for example, the framing of packets within the network. The data link layer may enable detection and/or correction of packet errors. The Ethernet (IEEE 802.3) protocol is one common link layer protocol that is used in modern computer networks.

Layer 1, the physical layer, is typically responsible for defining the physical means, which may comprise optical, electrical and/or mechanical means for communicating data via network devices over a communication medium. The converting the bit stream from Layer 2 into a series of physical signals for transmission over a medium. Layer 2 technologies such as Ethernet may implement a number of Layer 1 protocols depending on whether the signal is to be transmitted over twisted-pair cabling or over-the-air for example.

At Layer 2, today's enterprise networks are based predominantly on IEEE 802.3 Ethernet technology. While Ethernet offers ubiquitous and inexpensive connectivity to the Enterprise, it is not particularly strong in controlling access to that network. Although IEEE has attempted to improve access control for wired Ethernet with the IEEE 802.1x standard, this standard did not receive widespread adoption due to a number of reasons. One of these negative factors related to IEEE 802.1x deployment was the fact that 802.1x only validated the users as they signed onto the network and it adhered to the one device per port model. There was no per-packet validation, neither was there any standardized method of implementing access control while supporting more than one device per port. Vendors did provide non-standardized means to provide the latter, but the former remained unimplemented.

IEEE standards 802.1ae, 802.1af, and 802.1ar form the basis of a new architecture for network access control for Ethernet networks. These three standards form a replacement for the existing IEEE 802.1x based access control mechanisms. The IEEE 802.1ae (MACSec) standard defines the data link layer encryption and authentication mechanisms. IEEE 802.1af (currently under development) defines the control plane and keying protocols for 802.1ae. IEEE 802.1ar (currently under development) defines how the network and the devices connected to the network identify and validate each other's identities.

MACSec integrates security into wired Ethernet by identifying the devices connecting to a LAN and classifying the devices as authorized or unauthorized. Exemplary network devices that may be identified and classified comprise computers, wireless access points, servers, VOIP telephones, routers, switches, bridges and hubs.

Although MACSec may provide greater network security and reliability, upgrading an existing network to be MACSec compatible may present problems. In this regard, MACSec provides network protection at the data link layer by encrypting the data of an Ethernet frame, inserting a header (Sec- TAG) between the source MAC address and the encrypted data, and appending an integrity check value (ICV) after the encrypted data. Consequently, because the SecTAG of a MACSec frame occupies the bit positions normally used for one or more virtual local area network (VLAN) tags in a traditional Ethernet frame, non-MACSec-enabled network nodes may be unable to process MACSec frames, as the SecTAG may be improperly parsed as a VLAN tag.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for tunneling MACSec packets through non-MACSec nodes, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for tunneling non-MACSec packets through non-MACSec network nodes. In this regard, aspects of the invention may be utilized for enabling transmission of MACSec Ethernet packets over MACSec and non-MACSec-enabled network nodes. In one embodiment of the invention, additional header information may be inserted into MACSec packets before the MACSec packet may be transmitted to a non-MACSec-enabled node. Accordingly, various aspects of the invention may enable removing the additional header information from a packet received from a non-MACSec-enabled node. To distinguish the packets comprising inserted additional header information, the tags may comprise a distinguishing Ethertype.

Figure 1A:
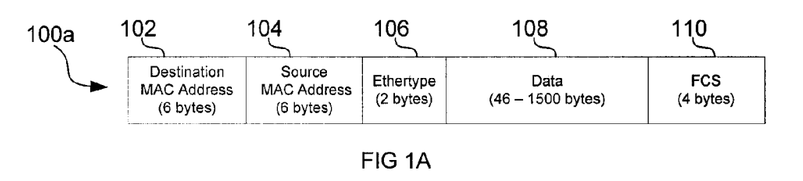
FIG. 1A is a diagram of an exemplary Ethernet packet, in connection with an embodiment of the invention.

FIG. 1A is a diagram of an exemplary Ethernet packet 100a, in connection with an embodiment of the invention. Referring to FIG. 1A, the Ethernet packet comprises a destination MAC address field 102, a source MAC address field 104, an Ethertype field 106, a data field 108, and a frame check sequence (FCS) 110.

The destination MAC address field 102 may comprise information that may be utilized to identify the node that the packet is to be sent to. The source MAC address 104 field may comprise information that may be utilized to identify the node that originated the packet. The Ethertype 106 field may comprise information that may be utilized to identify the protocol (e.g. IPv4 or IPv6) being transported in the packet. The data field 108 may contain the data being transmitted. The FCS 110 may comprise information that may be utilized to provide error detection for the packet.

In operation, when a packet such as 100a arrives at a network node, the node may parse one or more fields of the packet to determine the actions to take with the packet. In this regard, the node may be a network switch and the switch may parse the source MAC address 102 and the destination MAC address 104 to determine an interface onto which to forward the packet. Alternatively, the node may be an end system and may parse the Ethertype field 106 to determine which network layer protocol to pass the data up to. Exemplary Ethertypes comprise 0x0800 for Internet protocol Version 4 (IPv4), 0x0806 for Address Resolution Protocol (ARP), and 0x86DD for IPv6.

Figure 1B:
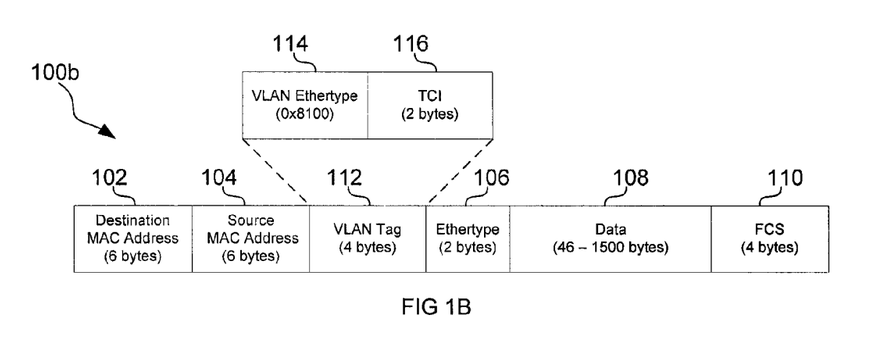
FIG. 1B is a diagram of an exemplary VLAN tagged Ethernet packet, in connection with an embodiment of the invention.
Figure 2A:
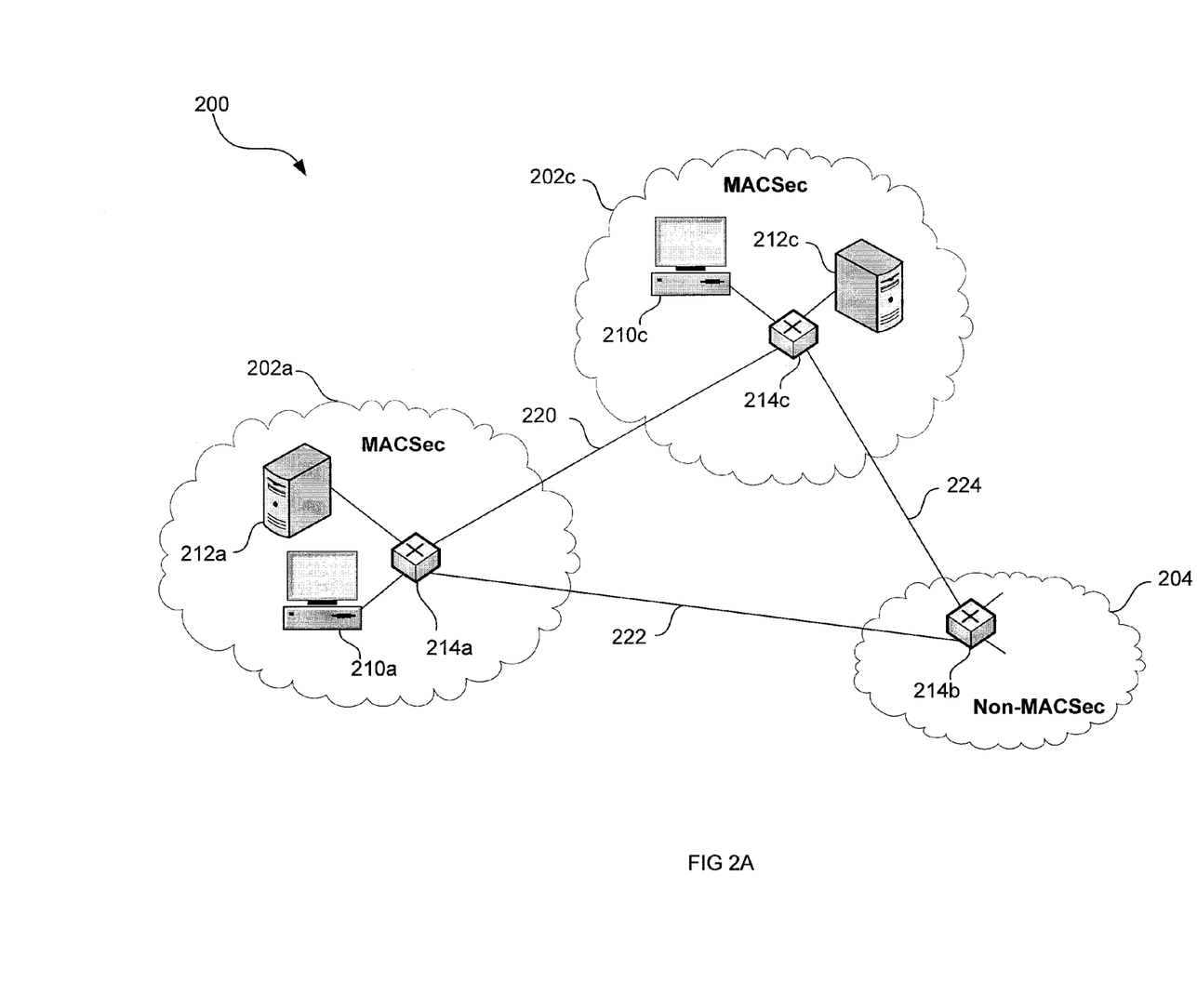
FIG. 2A is a diagram of an exemplary network that may enable transmitting and receiving MACSec packets across MACSec and non-MACSec nodes, in accordance with an embodiment of the invention.

FIG. 1B is a diagram of an exemplary VLAN tagged Ethernet packet 100b, in connection with an embodiment of the invention. Referring to FIG. 2A, the VLAN tagged Ethernet packet may comprise a VLAN tag 112 inserted after the source MAC address and before the Ethertype field.

The VLAN tag 112 may comprise a VLAN Ethertype 114 and a tag control information (TCI) field 116. The VLAN Ethertype 114 may comprise a numerical identifier which may indicate that the packet has been VLAN tagged and may be parsed accordingly. An exemplary numerical identifier may comprise 0x8100. The TCI field 116 may comprise two bytes of information which may be utilized to determine a priority level for the packet, the packet's compatibility for Ethernet and token-ring networks, and may comprise a numerical identifier of the VLAN to which the packet belongs.

In this regard, the VLAN tagged packet 100b has an altered structure as compared to 100a and a network node may thus need a way to identify the format of a received packet so that the packet may be parsed properly. Accordingly, the VLAN Ethertype 114 may be utilized to indicate to the network node that the packet may be a VLAN tagged packet.

Figure 1C:
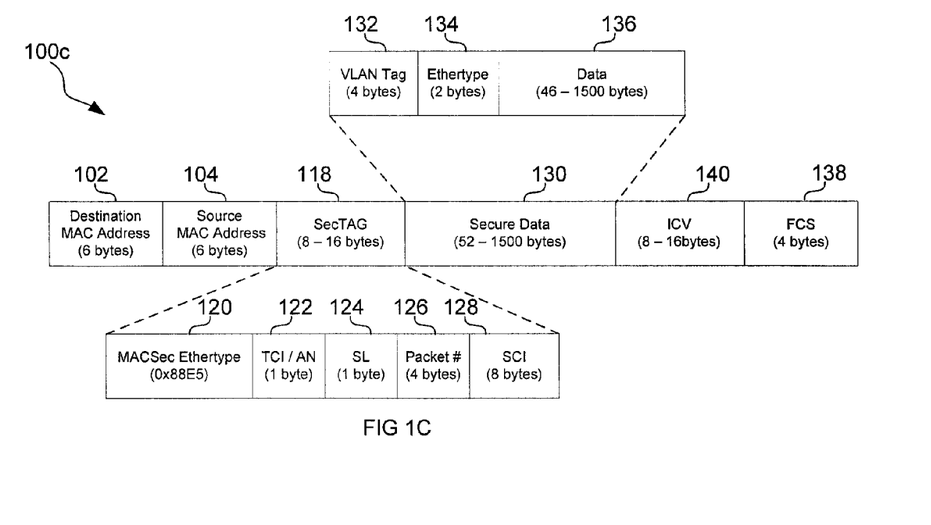
FIG. 1C is a diagram of an exemplary MACSec packet, in connection with an embodiment of the invention.

FIG. 1C is a diagram of an exemplary MACSec packet 100c, in connection with an embodiment of the invention. Referring to FIG. 1C, the MACSec packet 100c may comprise a security tag (SecTAG) 118, a secure data field 130, and an integrity check value (ICV) 140.

The security tag (SecTAG) may be inserted after the source MAC address field and may comprise a MACSec Ethertype 120, a TCI/AN field 122, a SL field 124, a packet number field 126, and a secure channel identifier (SCI) field 128. The MACSec Ethertype 120 may comprise a numerical identifier, 0x88E5, which may indicate that the packet is a MACSec packet and may be parsed accordingly. The TCI/AN filed 122 may comprise information that may be utilized to determine a version of the MACSec protocol utilized in the packet and may comprise information that may be utilized to transmit the packet over a secure channel. The SL field 124 may comprise information that may be utilized to determine the number of bytes between the last byte of the SecTAG and the first byte of the ICV 140. The packet number field 126 may comprise a monotonically increasing value to prevent against "replay" attacks. The SCI field 128 may comprise information that may be utilized to identify the source address and port that transmitted the packet.

The secure data field 130 may comprise a VLAN tag 132, an Ethertype 134, and a data field 136. The VLAN tag 132 may comprise information similar to that of the VLAN tag 104 in FIG. 1A, with the difference that the VLAN tag 132 may be encrypted. The Ethertype 134 may comprise information similar to that of the Ethertype 106 in FIG. 1A, with the difference that the Ethertype 134 may be encrypted. The data field 136 may comprise information similar to that of the data field 108 in FIG. 1A, with the difference that the data field 136 may be encrypted.

The integrity check value (ICV) 140 may comprise information that may that may be utilized to verify the integrity of the packet 100*c*. The FCS 138 may comprise information similar to that of the FCS 110 in FIG. 1A.

The MACSec packet 100*c* may have an altered format as compared to the packets 100*a* and 100*b*, and a network node may thus need a way to identify the format of a received packet so that the packet may be parsed properly. Accordingly, the MACSec Ethertype 120 may indicate to the network node that the packet is a MACSec packet. However, because the MACSec protocol has only recently been standardized, a large percentage of the networking hardware deployed in existing networks may not be MACSec compatible. In this regard, the hardware may not recognize the MACSec Ethertype 120, for example 0x88E5, as a valid Ethertype and may be unable to properly parse MACsec packets, such as the MACSec packet 100*c*.

Figure 1D:
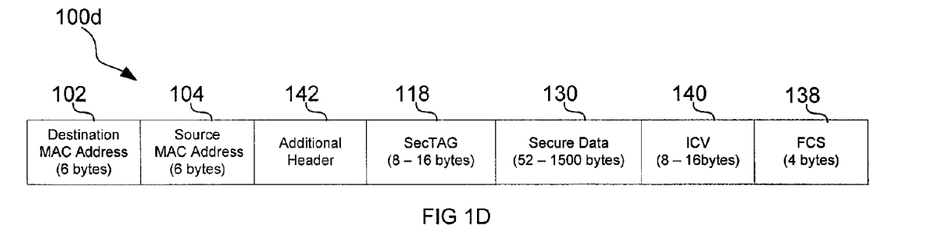
FIG. 1D is a diagram of an exemplary MACSec packet modified so that it may traverse MACSec and non-MACSec enabled nodes, in accordance with an embodiment of the invention.

FIG. 1D is a diagram of an exemplary MACSec packet 100*d* modified so that it may traverse MACSec and non-MACSec enabled nodes, in accordance with an embodiment of the invention. Referring to FIG. 1D, the packet may comprise additional header information 142 inserted after the source MAC address field.

In one embodiment of the invention, the inserted additional header information 142 may comprise one or more VLAN tags, such as the VLAN tag 112, with an Ethertype of 0x8100, for example. In this manner, when the packet 100*d* arrives at a non-MACSec enabled network node, the node will parse the 0x8100 Ethertype and identify the packet as a VLAN tagged Ethernet packet and may forward the packet accordingly. When the packet arrives at a MACSec enabled node, the node may parse the 0x8100 Ethertype and recognize that the packet has been modified to traverse a non-MACSec-enabled node. Accordingly, the MACSec-enabled node may strip off the additional header information 142 before further parsing and processing the MACSec packet.

FIG. 2A is a diagram of an exemplary network that may enable transmitting and receiving MACSec packets across MACSec and non-MACSec enabled nodes, in accordance with an embodiment of the invention. Referring to FIG. 2 the exemplary network 200 may comprise a plurality of MACSec-enabled networks 202 and a non-MACSec enabled network 204. Each of the exemplary networks 202, 204 of FIG. 2, may comprise a computer 210, a server 212, and a switch 214. Also shown are transmission paths 220, 222, and 224. Transmission path 220 may communicatively couple the network 202*a* to the network 202*c* via switches 214*a* and 214*c*. Transmission path 222 may communicatively couple the network 202*a* to the network 204 via switches 214*a* and 214*b*. Transmission path 224 may communicatively couple the network 204 to the network 202*c* via switches 214*b* and 214*c*. Although only three exemplary clouds are depicted, the network may comprise any number and combination of networks. Additionally, each network may comprise any number of computer, servers, switches, routers, hubs, or any other network nodes.

The computers 210 and servers 212 may comprise suitable logic, circuitry, and/or code that may enable the generation and exchange of messages over the network. In this regard, the computers 210 and the servers 212 may generate application layer messages, which may be passed down the network abstraction layers to be transmitted across the network. Similarly, the computers 210 and the servers 212 may enable receiving data from the network, parsing the data and passing it up the network abstraction layers.

The switches 214 may comprise suitable logic, circuitry, and/or code for receiving Ethernet packets from the network, parsing the packets to determine one or more destination nodes for the packets, and forwarding the packets to one or more nodes in the network. In this regard, the switches 214 may implement the Layer 2 functions of parsing and encapsulating Ethernet packets as well as the Layer 1 function of receiving and transmitting the bits of these packets over the physical medium.

In operation, an exemplary network communication may comprise the computer 210*a* generating a message and transmitting it into the network in the form of one or more MACSec packets destined for the server 212*c*. In this exemplary communication, the MACSec packets, upon reaching the switch 214*a*, may take one of two routes to reach the server 212*c*. The first route (path 220) comprises the MACSec packets traveling directly from the MACSec-enabled switch 214*a* to the MACSec enabled switch 214*c*. The second route (paths 222 and 224) comprises the MACSec packets traveling from the MACSec-enabled switch 214*a* to the non-MACSec enabled switch 214*b* and then to the MACSec-enabled switch 214*c*.

In transmitting one or more MACSec packets between the switches 214*a* and 214*c* via the path 220, aspects of the invention may enable the switch 214*a* to determine that the switch 214*c* is a MACSec-enabled node and may enable the switch 214*a* to transmit the MACSec packets without inserting any additional header information into the packets. In this regard, the packets transmitted over path 220 may be in the form of the packet 100*c*. Additionally, aspects of the invention may enable the switch 214*c* to determine that packets received from the switch 214*a* may be in the form of the packet 100*c*, and the switch 214*c* may parse the packets accordingly.

In transmitting one or more MACSec packets between the switches 214*a* and 214*c* via the paths 222 and 224, aspects of the invention may enable the switch 214*a* to determine that the switch 214*b* is a non-MACSec-enabled switch and may enable the switch 214*a* to insert additional header information, such as the header information 142 in FIG. 1D, into the packets before transmitting the packets to switch 214*b*. In this regard, the packets transmitted from the switch 214*a* to the switch 214*c* via paths 222 and 224 may be in the form of the packet 100*d*. Additionally, aspects of the invention may enable the switch 214*c* to determine that packets received from the switch 214*b* may be in the form of the packet 100*d*.

In this regard, various aspects of the invention may enable the switch 214c to strip additional header information from the packets received from the switch 214b before further parsing and processing the packets. In an exemplary embodiment of the invention, the additional header information may comprise one or more VLAN tags.

Figure 2B:
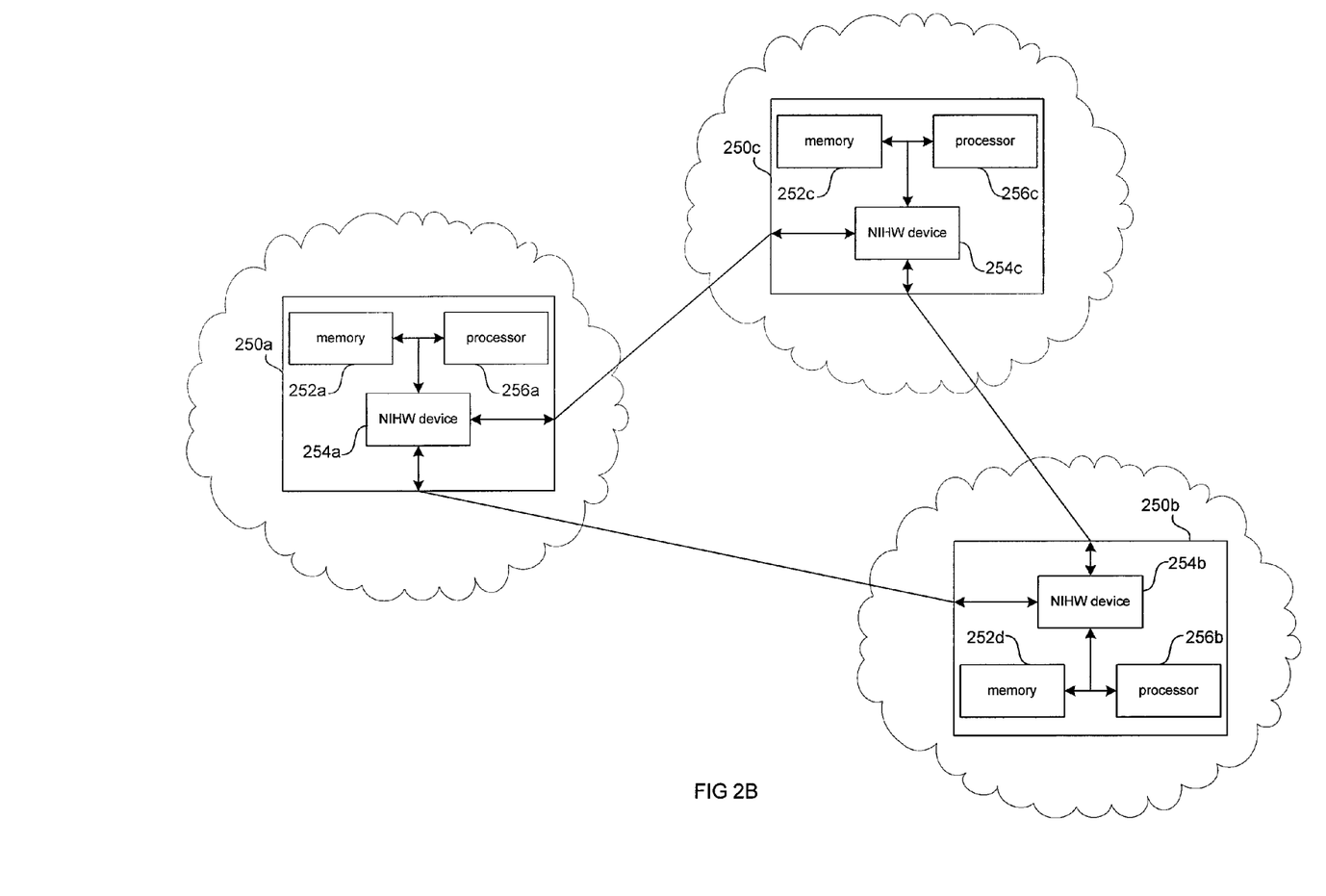
FIG. 2B is a diagram of an exemplary network, similar to the network 200, comprising nodes 250 that may enable transmitting and receiving MACSec packets across MACSec and non-MACSec nodes accordance with an embodiment of the invention.

FIG. 2B is a diagram of an exemplary network, similar to the network 200, comprising nodes 250 that may enable transmitting and receiving MACSec packets, in accordance with an embodiment of the invention. In this regard, the nodes 250 may represent switches such as the switches 214 in FIG. 2A. Referring to FIG. 2B, the exemplary node 250 may comprise a memory 252, a network interface hardware device 254, and a processor 256.

The memory 252 may comprise suitable logic, circuitry, and/or code that may enable storing information utilized for a processing of packets. In this regard, the memory 252 may comprise one or more lookup-tables/databases that may enable determining if a network node is MACSec compatible, one or more lookup-tables/databases that may enable determining additional header information to insert into a MACSec packet, and one or more lookup-tables/databases that may enable generating one or more control bits that may be utilized by the processor 256 to process and forward the packets.

The NIHW device 254 may comprise suitable logic, circuitry, and/or code that may enable reception and/or transmission of packets in a network. In this regard, the NIHW device 254 may enable reception and transmission of bits over a physical medium and may enable communicating the received bits to the processor 256 and/or the memory 252.

The processor 256 may comprise suitable logic, circuitry, and/or code that may enable the processor 256 to interface with the memory 252 and the NIHW device 254 to receive, process, and forward packets. In this regard, the processor may provide control signals and/or instructions to the memory 252 and the NIHW device 254 that may enable the node 250 to receive and transmit packets in the formats described in the packets 100b, 100c and 100d of FIG. 1.

In operation, a packet may arrive at the node 250 in the form of a bit-stream over a physical medium. The NIHW device 254 may receive the bits and communicate them to the processor 256 and/or the memory 252. The processor 256 may parse the Ethertype field of the received packet and may determine if the packet comprises a MACSec packet, such as the packet 100c, or a modified MACSec packet, such as the packet 100d. If the source of the packet is MACSec-enabled, the Ethertype field may indicate that the packet is in the form of the packet 100c. Accordingly, the processor may further parse and process the packet. If the source of the packet is non-MACSec-enabled, the Ethertype field may indicate that the packet is in the form of the packet 100d. Accordingly, the processor may strip a tag from the packet before further parsing and processing the packet. Additionally, the processor may convert the additional header information removed from the packet into one or more control bits, which may be utilized to further parse and process the packet.

When a packet is to be forwarded, the processor may search the memory 252, and may determine if reaching the destination requires traversing a non-MACSec-enabled node in the network. In this regard, for example, the processor may search the memory 252 for the destination MAC address of the packet and/or the egress port via which the packet may be transmitted. If the destination does not require traversing a non-MACSec-enabled node, then the processor may format the packet similar to the packet 100c and the NIHW device 254 may transmit the packet into the network. If the destination does require traversing a non-MACSec-enabled, the processor may insert additional header information, such as the header information 142 in the packet 100d, and the NIHW device 254 may transmit the packet into the network. In this regard, the processor may determine the additional header information to insert by utilizing the one or more control bits created when the packet was received and/or by utilizing the memory 252. In an exemplary embodiment of the invention, the additional header information may comprise one or more VLAN tags.

Figure 3:
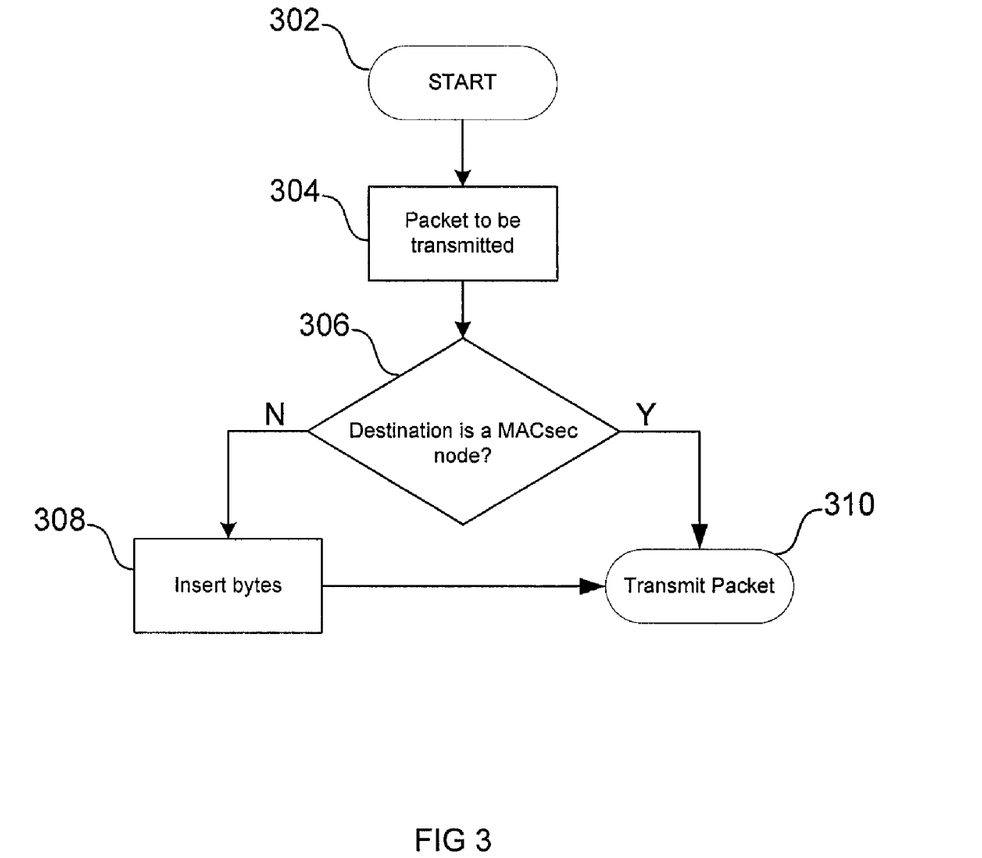
FIG. 3 is a flowchart illustrating exemplary steps that may be utilized in transmitting MACSec packets to a network that may contain both MACSec nodes and non-MACSec enabled nodes, in accordance with an embodiment of the invention.

FIG. 3 is a flowchart illustrating exemplary steps comprising a process that may be utilized in transmitting MACSec packets over a network that may contain both MACSec-enabled nodes and non-MACSec-enabled nodes, such as the network 200 in FIG. 2A, in accordance with an embodiment of the invention. Referring to FIG. 3, the process may start with a step 304 where a packet is ready for transmission by a network node, such as the computer 210a in FIG. 2A, and the process may then advance to a step 306. In the step 306 it may be determined whether reaching the destination may require traversing a non-MACSec-enabled node, such as the switch 214b, in the network. In instances where it may be determined that reaching the destination does not require traversing a non-MACSec-enabled node, then the process may advance to a step 310 where the packet, in the form of the packet described in FIG. 1B, may be transmitted into the network.

Returning to the step 306, in instances where it may be determined that the destination does require traversing a non-MACSec-enabled node, such as the switch 214b, then the process may advance to a step 308 where additional header information, such as one or more VLAN tags, for example, may be inserted after a source MAC address field, as shown by the additional header info in FIG. 1D. Following the step 308, the process may advance to the step 310.

Figure 4:
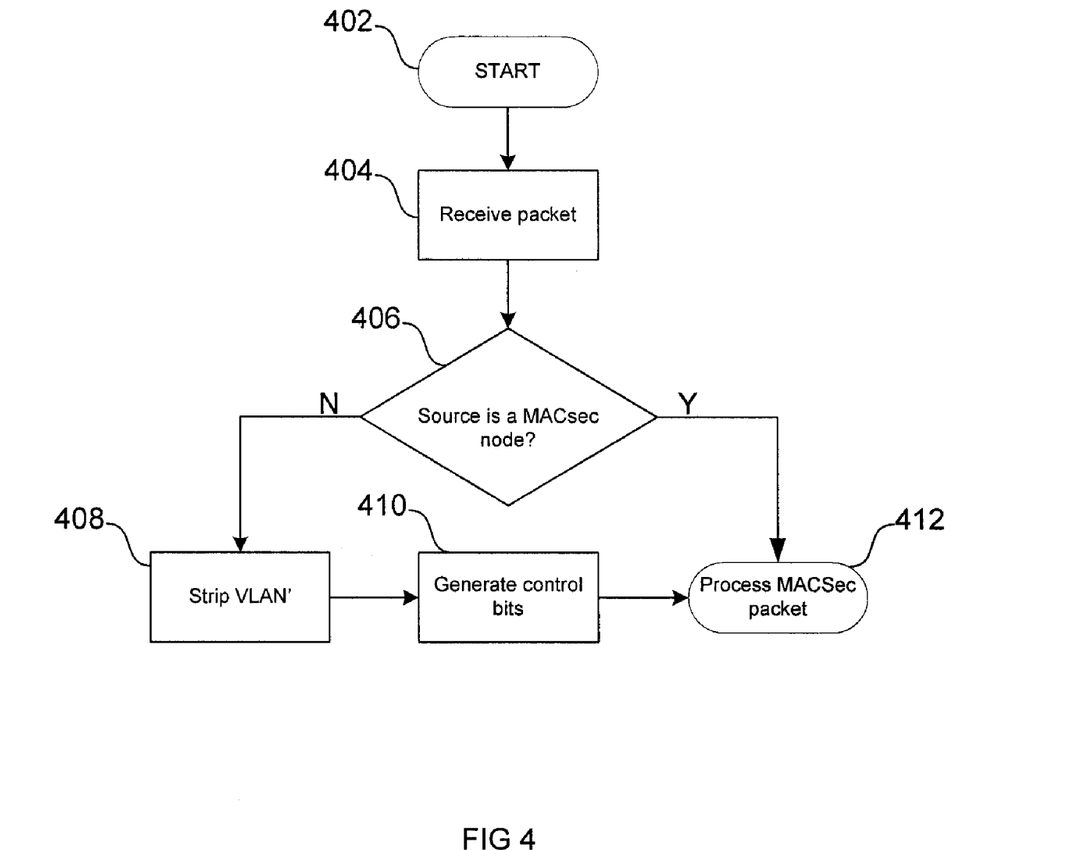
FIG. 4 is a flowchart illustrating exemplary steps that may be utilized in utilized in receiving MACSec packets from a network that may contain both MACSec and non-MACSec-enabled nodes, in accordance with an embodiment of the invention.

FIG. 4 is a flowchart illustrating exemplary steps comprising a process that may be utilized in receiving MACSec packets from a network, such as the network 200 in FIG. 2A, that may contain both MACSec-enabled nodes and non-MACSec-enabled nodes, in accordance with an embodiment of the invention. Referring to FIG. 4 the process may start with a step 404 when a packet is received at a network node, such as the switch 214c in FIG. 2A, and the process may then advance to a step 406. In the step 406 it may be determined, based on an Ethertype of the packet, if the packet has arrived from a MACSec-enabled node, such as the switch 214a. In instances where it may be determined that the packet has arrived from a MACSec-enabled node, and may be in the form of the packet described in FIG. 1C, then the process may advance to a step 412 where the MACSec packet can be processed. In this regard, the processing of the packet may comprise parsing the packet, decrypting the packet, authenticating the packet, validating the packet, and/or preparing the packet for forwarding.

Returning to the step 406, in instances where it may be determined that the packet has arrived from a non-MACSec-enabled node, such as the switch 214c, and is in the form of the packet described in FIG. 1D, then the process may advance to a step 408. In the step 408, additional header information may be removed from the packet and the process may advance to a step 410. In the step 410, the removed additional header information may be converted into one or more control bits, which may be utilized to preserve the information comprising the removed additional header information, and the process may advance to the step 412.

Aspects of the invention may be found in a method and system for determining whether a destination of a MACSec packet, such as the packet 100c, requires traversing one or more non-MACSec enabled network nodes, such as the switch 214b, and inserting additional header information in the MACSec packet based on the determination, such as header 142 in the packet 100d. The inserted additional header information 142 may be generated based on one or more control bits generated from one or more received packets. The inserted additional header information may allow identification of the MACSec packet by MACSec and non-MACSec enabled nodes. In this regard, in an exemplary embodiment of the invention, the additional header information may comprise one or more VLAN tags, similar to the VLAN tag 112 in FIG. 1B, and/or an Ethertype field, similar to one or more of the Ethertype fields 104, 114, 134 in FIG. 1, that may enable the identification of the MACSec packet.

In various embodiments of the invention, the additional header information may be inserted between a source MAC address field 104 and a SecTAG 118 of a MACSec packet, as shown in the packet 100d. The inserted additional header information in the MACSec packet may be parsed by a network and may comprise an Ethertype that identifies the inserted header information. In this manner, various embodiments of the invention may enable removal of the inserted header 142 based on the identifying Ethertype. The removed header information may be converted to one or more control bit based which may enable processing of the MACSec packet.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for computer networking the method comprising:
   performing by one or more processors in a first network node:
   determining whether a destination of a MACSec packet requires traversing one or more non-MACSec enabled network nodes; and
   inserting, based on said determination, additional header information in said MACSec packet to allow said MACSec packet to be identified when said MACSec packet traverses said one or more non-MACSec enabled nodes, wherein said additional header information is distinct from a SecTAG of said MACSec packet.

2. The method according to claim 1, comprising inserting said additional header information in said MACSec packet at a position located after a last bit of a source MAC address field and before a first bit of a SecTAG of said MACSec packet.

3. The method according to claim 1, wherein said additional header information comprises one or more VLAN tags.

4. The method according to claim 1, wherein said additional header information comprises an Ethertype field that enables identification of said MACSec packet.

5. The method according to claim 1, wherein, upon receiving said MACSec packet comprising said inserted additional header information, a second network node parses said inserted additional header information in said MACSec packet.

6. The method according to claim 5, wherein said second network node identifies an Ethertype associated with said parsed inserted additional header information in said MACSec packet.

7. The method according to claim 6, wherein said second network node removes said inserted additional header information from between a source MAC address field and a SecTAG of said MACSec packet based on said Ethertype.

8. The method according to claim 7, wherein said second network node generates one or more control bits based on said removed additional header information.

9. The method according to claim 8, wherein said second network node processes said MACSec packet based on said generated one or more control bits.

10. The method according to claim 1, comprising generating said additional header information inserted in said MACSec packet based on one or more control bits present in a received packet.

11. The method according to claim 1, wherein said MACSec packet comprising said inserted additional header information is identifiable by a MACSec enabled node.

12. A machine-readable storage having stored thereon, a computer program having at least one code section for enabling computer networking, the at least one code section being executable by a machine for causing the machine to perform steps comprising:
   in a first network node, determining whether a destination of a MACSec packet requires traversing one or more non-MACSec enabled network nodes; and
   in said first network node, inserting, based on said determination, additional header information in said MACSec packet to allow said MACSec packet to be identified when said MACSec packet traverses said one or more non-MACSec enabled nodes, wherein said additional header information is distinct from a SecTAG of said MACSec packet.

13. The machine-readable storage according to claim 12, wherein said at least one code section enables insertion of said additional header information in said MACSec packet at a position located after last bit of a source MAC address field and before a first bit of a SecTAG of said MACSec packet.

14. The machine-readable storage according to claim 12, wherein said additional header information comprises one or more VLAN tags.

15. The machine-readable storage according to claim 12, wherein said additional header information comprises an Ethertype field that enables identification of said MACSec packet.

16. The machine-readable storage according to claim 12, wherein upon receiving said MACSec packet comprising said inserted additional header information, a second network node parses said additional header information in said MACSec packet.

17. The machine-readable storage according to claim 16, wherein said second network node identifies an Ethertype associated with said parsed inserted additional header information in said MACSec packet.

18. The machine-readable storage according to claim 17, wherein said second network node removes said inserted additional header information from between a source MAC address field and a SecTAG of said MACSec packet based on said Ethertype.

19. The machine-readable storage according to claim 18, wherein said second network node generates one or more control bits based on said removed additional header information.

20. The machine-readable storage according to claim 19, wherein said second network node processes said MACSec packet based on said generated one or more control bits.

21. The machine-readable storage according to claim 12, wherein said at least one code section enables generation of said additional header information inserted in said MACSec packet based on one or more control bits present in a received packet.

22. The machine-readable storage according to claim 12, wherein said MACSec packet comprising said inserted additional header information is identifiable by a MACSec enabled node.

23. A system for computer networking, the system comprising:
at least one processor in a first network node, said at least one circuit and/or processor being operable to:
determine whether a destination of a MACSec packet requires traversing one or more non-MACSec enabled network nodes; and
insert, based on said determination, additional header information in said MACSec packet to allow said MACSec packet to be identified when said MACSec packet traverses said one or more non-MACSec enabled nodes, wherein said additional header information is distinct from a SecTAG of said MACSec packet.

24. The system according to claim 23, wherein said at least one processor is operable to insert said additional header information in said MACSec packet at a position located after last bit of a source MAC address field and before a first bit of a SecTAG of said MACSec packet.

25. The system according to claim 23, wherein said additional header information comprises one or more VLAN tags.

26. The system according to claim 23, wherein said additional header information comprises an Ethertype field that enables identification of said MACSec packet.

27. The system according to claim 23, wherein upon receiving said MACSec packet comprising said inserted additional header information, a second network node parses of said inserted additional header information in said MACSec packet.

28. The system according to claim 27, wherein said second network node identifies an Ethertype associated with said parsed inserted additional header information in said MACSec packet.

29. The system according to claim 28, wherein said second network node removes said inserted additional header information from between a source MAC address field and a SecTAG of said MACSec packet based on said Ethertype.

30. The system according to claim 29, wherein said second network node generates one or more control bits based on said removed additional header information.

31. The system according to claim 30, wherein said second network node processes of said MACSec packet based on said generated one or more control bits.

32. The system according to claim 23, wherein said at least one processor is operable to generate said additional header information inserted in said MACSec packet based on one or more control bits present in a received packet.

33. The system according to claim 23, wherein said MACSec packet comprising said inserted additional header information is identifiable by a MACSec enabled node.

* * * * *